United States Patent

[11] 3,572,456

| [72] | Inventor | Arthur D. Healy |
| | | 1939 S. 48th Court, Cicero, Ill. 60650 |
| [21] | Appl. No. | 790,027 |
| [22] | Filed | Jan. 9, 1969 |
| [45] | Patented | Mar. 30, 1971 |

[54] BANKABLE TRICYCLE TYPE VEHICLE
7 Claims, 5 Drawing Figs.

[52] U.S. Cl. .................................................. 180/27, 280/112, 180/66
[51] Int. Cl. .................................................. B62h 61/08
[50] Field of Search ....................................... 180/27, 25, 26, 41, 72; 280/111, 112, 112.(1), 267

[56] References Cited
UNITED STATES PATENTS

| 1,457,025 | 5/1923 | Gerlinger | (180/72UX) |
| 2,415,928 | 2/1947 | Barr | (180/72UX) |
| 3,154,164 | 10/1964 | Shaw et al. | 280/111X |
| 3,480,098 | 11/1969 | Ward | 280/111X |

FOREIGN PATENTS

| 11,300 | 1910 | Great Britain | 280/267 |
| 795,611 | 3/1936 | Italy | 180/41 |
| 1,101,975 | 4/1955 | France | 280/112 |
| 1,063,473 | 8/1959 | Germany | 280/112 |

Primary Examiner—Kenneth H. Betts
Attorney—Burmeister, Palmatier & Hamby

ABSTRACT: The tricycle type vehicle has a steerable wheel and two outboard wheels which are rotatably mounted on subframes. A parallelogram linkage is connected between the main frame and the subframes so that the entire vehicle is bankable, including the main frame, the subframes and all three wheels. The linkage keeps the outboard wheels parallel to each other and to the main frame. The outboard wheels are movable parallel to the main frame by corresponding amounts but in opposite directions. Resilient means are preferably provided, tending to maintain a rectangular relationship between the elements of the parallelogram linkage. The outboard wheels may be driven in such a manner as to avoid any interference with the action of the parallelogram linkage. Spring mounting means may be provided between each outboard wheel and the corresponding subframe.

Patented March 30, 1971 3,572,456

Inventor
Arthur D. Healy
By Burmeister, Palmatier & Hamby
Attorneys

Inventor
Arthur D. Healy
By Burmeister, Palmatier & Hamby
Attorneys

BANKABLE TRICYCLE TYPE VEHICLE

This invention relates to cycle type vehicles, such a as bicycles, tricycles and the like. The invention is particularly applicable to cycle type vehicles having three or four wheels. The vehicle of the present invention may be either motorized or driven by pedals or the like.

Bicycles and two wheel motorcycles have the advantage of simplicity and low cost, but do not have inherent stability when negotiating curves, the stability of the vehicle being dependent upon the balancing skill of the operator. Tricycles, both motorized and pedal driven, have inherent stability on curves, but such stability is rather limited, because such vehicles are not bankable. For this reason, the safe speeds at which a tricycle can negotiate a curve is rather limited.

The present invention provides a cycle type vehicle which combines the advantages of a bicycle and a tricycle, in that the vehicle of the present invention has inherent stability, like a tricycle, yet is bankable, like a bicycle, so that curves can be negotiated at high speed. The vehicle of the present invention will generally have three wheels, but may also have four wheels. Typically, the present invention provides a vehicle having one steerable wheel, like that of a bicycle, and two outboard wheels, disposed like those of a tricycle. However, the outboard wheels are mounted on subframes which are connected to the main frame by a parallelogram linkage. In this way, the outboard wheels are maintained parallel to each other and to the main frame. The outboard wheels are movable parallel to the main frame by corresponding amounts but in opposite directions. Thus, the operator can bank the entire vehicle, while keeping all three wheels in engagement with the ground. Resilient means are preferably provided, tending to maintain the parallelogram linkage in a rectangular condition, with the main frame and the outboard wheels in upright positions. Thus, the vehicle has inherent stability so that it will remain upright when it is stationary. The inherent stability also makes it easy to operate the vehicle at very low speeds, without any balancing problem. The ability to bank the vehicle makes it possible to negotiate curves at high speed, in much the same manner as in the case of a two wheeled vehicle. The outboard wheels are preferably driven in such a manner as to avoid any interference with the action of the parallelogram linkage. Thus, for example, separate driving motors may be mounted on the two subframes to drive the outboard wheels. Spring mountings may be provided between the outboard wheels and the subframes. The invention may be embodied in a four wheel vehicle having front and rear parallelogram linkages. The wheels of at least one pair are steerable.

Further objects and advantages of the present invention will appear from the following description, taken with the accompanying drawings, in which.

Figure 1:
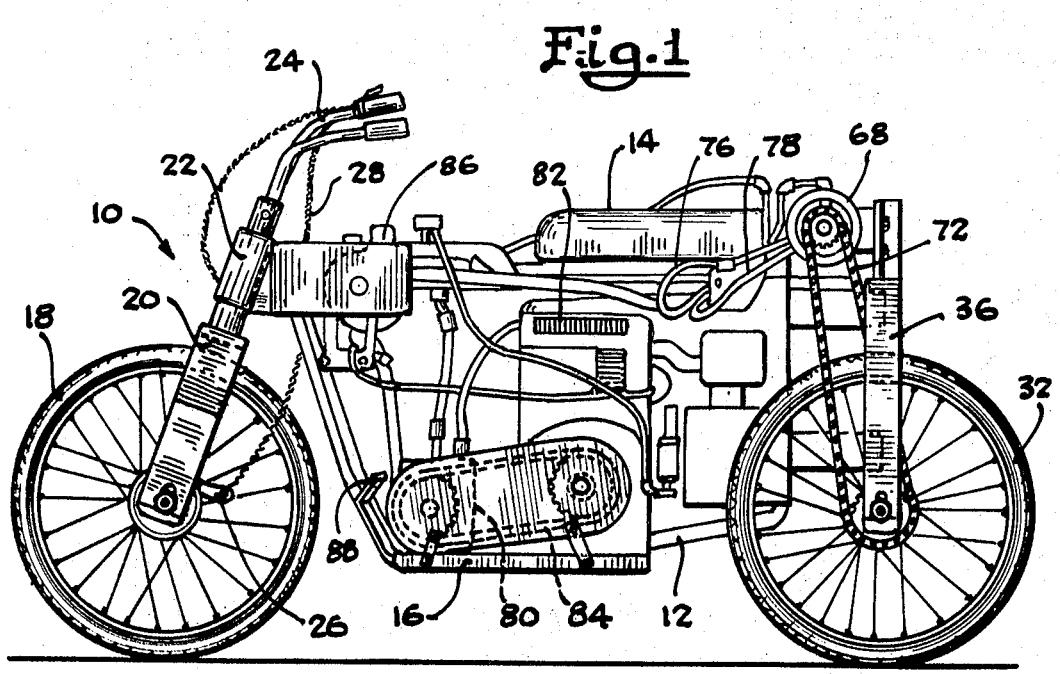
FIG. 1 is a side elevation of a bankable motorized tricycle, to be described as an illustrative embodiment of the present invention.
Figure 2:
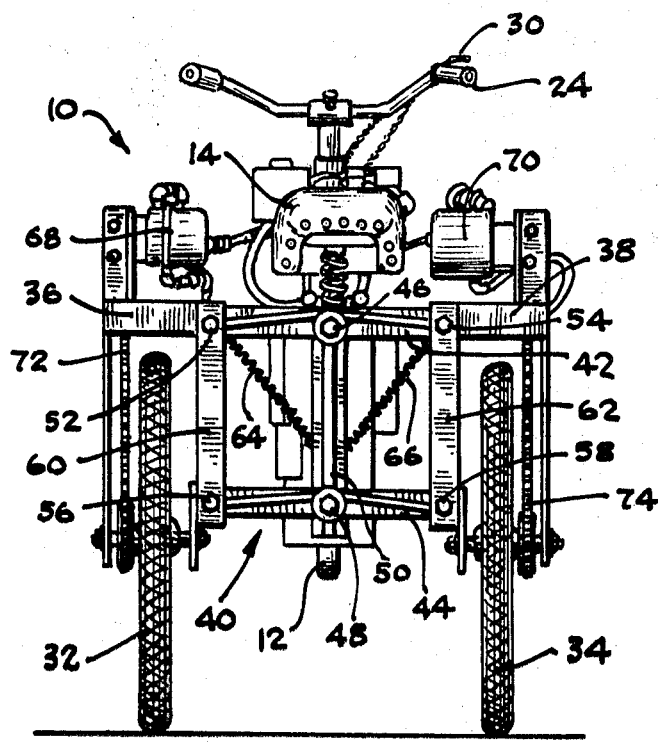
FIG. 2 is a rear view of the motorized tricycle, in a an upright position.

It will be seen that FIGS. 1 and 2 illustrate a motorized tricycle 10 having an upright frame 12 similar to that of a motorcycle. A seat 14 for the operator is provided on the frame 12. Left- and right-hand footboards 16 are also provided.

The motorcycle 10 has a steerable wheel 18 which is shown as the front wheel but could be at the rear end of the vehicle. The illustrated wheel 18 is rotatably mounted on a fork 20 which is steerably supported by a bearing 22 at the front end of the frame 12. A conventional handlebar 24 is provided to steer the wheel 18. A braking mechanism 26 is preferably provided for the front wheel 18. As shown, the braking mechanism 26 is connected by means of a flexible slide wire 28 to an operating lever 30 on the handlebar 24.

Figure 3:
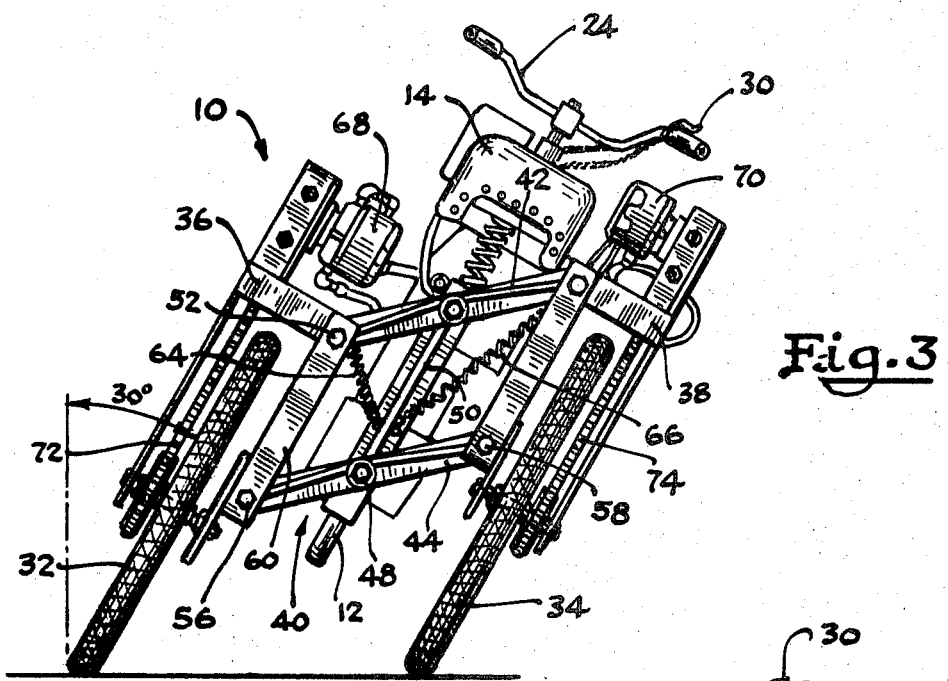
FIGS. 3 and 4 are rear views similar to FIG. 2, but showing the motorized tricycle banked in opposite directions.
Figure 4:
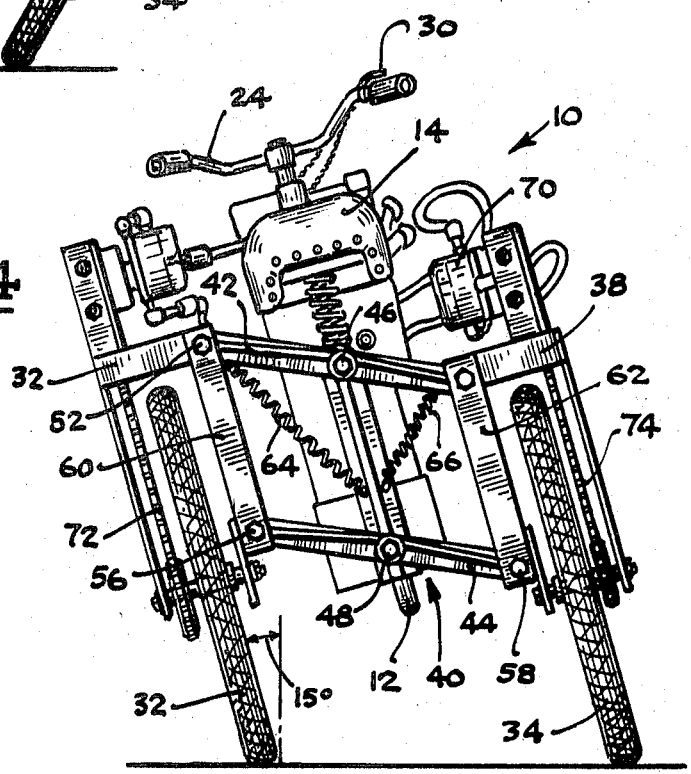

The motorized tricycle 10 has left- and right-hand outboard wheels 32 and 34 which are shown as being at the rear of the vehicle, but could be at the front. The wheels 32 and 34 are rotatably mounted on left- and right-hand subframes or forks 36 and 38. To provide for the banking of the entire vehicle, these subframes 36 and 38 are movable parallel to the main frame 12 b7 in opposite directions. In this way, the vehicle can be banked to the right, as shown in FIG. 3, or to the left, as shown in FIG. 4. It will be seen that the wheels 32 and 34 are kept parallel to each other, and also to the main frame 12. The sub subframes 36 and 38 are movable by corresponding amounts, but in opposite directions, relative to the main frame 12.

This action is achieved by providing a parallelogram linkage 40 between the main frame 13 and the subframes 36 and 38. The parallelogram linkage 40 may assume various forms. As shown, it comprises upper and lower links or levers 42 and 44. Pivot connections 46 and 48 are provided between the main frame 12 and the links 42 and 44. The pivot connections 46 and 48 are made to a vertical member 50 on the main frame 12, and to central portions of the upper and lower links 42 and 44. As shown, the pivot connections 46 and 48 are aligned with the vertical axis of the main frame 12.

Left- and right-hand pivot connections 52 and 54 are provided between the subframes 36 and 38 and the corresponding ends of the upper link 42. Similarly, left- and right-hand pivot connections 56 and 58 are provided between the subframes 36 and 38 and the lower link 44. The illustrated subframes 36 and 38 have vertical members 60 and 62 extending between the upper pivot connections 52 and 54 and the lower pivot connections 56 and 58. As shown in FIG. 2, the upper pivot 52 is vertically aligned with the lower pivot 56. Similarly, the upper pivot 54 is vertically aligned with the lower pivot 58.

The pivots 52, 46, 48 and 56 form one parallelogram, while the pivots 46, 54, 58 and 48 form another adjacent parallelogram. These parallelograms have one side in common, defined by the pivots 46 and 48 on the main frame 12.

When the tricycle 10 is upright, as shown in FIG. 2, the parallelograms are rectangular, and the links 42 and 44 are in a rectangular relationship to the main frame 12. When the tricycle is banked, as shown in FIGS. 3 and 4, the parallelograms become angular rather than rectangular, and the links 42 and 44 are in angular or tilted positions relative to the main frame 12.

Resilient means are preferably provided, tending to maintain the tricycle 10 in its upright position, with the parallelogram linkage 40 in a rectangular configuration. As shown in FIG. 2, such resilient means comprise left- and right-hand springs 64 and 66, connected between the parallelogram linkage 40 and the main frame 12. The illustrated springs are of the coiled extension type and are connected diagonally between the main frame 12 and the opposite end portions of the upper link 42. When the tricycle is upright, as shown in FIG. 10, the tension in the two springs 64 and 66 is the same. When the tricycle is banked, as shown in FIGS. 3 and 4, one spring is stretched more than the other. The greater tension in the stretched spring tends to restore the tricycle to its upright position. The strength of the springs 64 and 66 is sufficient to keep the tricycle upright when it is stationary. Thus, the tricycle has inherent stability. Accordingly, the operator can park the tricycle and ride it at low speeds without any effort.

Means are provided to drive the outboard wheels 32 and 34. Such means are arranged to obviate any interference with the action of the parallelogram linkage 40. Various drive means may be provided. As shown, the wheels 34 and 34 are adapted to be driven by separate motors 68 and 70, mounted on the subframes 36 and 38. Chain type drives 72 and 74 are provided between the motors and the wheels.

The motors 68 and 70 may be of various types, but are illustrated as being of the hydraulic type. Hydraulic fluid is carried to and from each of the motors 68 and 70 by means of hoses or other flexible conduits 76 and 78.

To operate the hydraulic motors 68 and 70, hydraulic fluid under pressure is provided by a pump 80, driven by an engine 82, mounted on the main frame 12. A chain drive 84 may be provided between the engine 82 and the pump 80.

The hydraulic fluid under pressure is supplied to the motors 68 and 70 through a manually operable control valve 86, whereby the operator can vary the speed of the motors. The control valve 86 may also be linked to a control pedal 88. Those skilled in the art will be familiar with variable speed hydraulic motor systems of this type.

Various other systems may be employed to drive the bankable outboard wheels 32 and 34. Thus, for example, various flexible mechanical drives may be employed. Electric driving systems may also be utilized.

Figure 5:
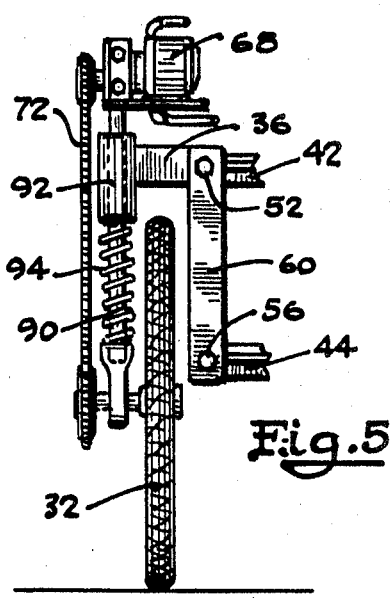
FIG. 5 is a fragmentary e rear view, similar to a portion of FIG. 2, but showing a modification in which the outboard wheels are spring mounted.

FIG. 5 illustrates a modified construction in which the outboard wheels are spring mounted on the corresponding subframes. Only the left-hand wheel 32 is shown in FIG. 5. The arrangement of the right-hand wheel is similar. It will be seen that the wheel 32 is rotatably mounted on a bar or member 90 which is slidable through a vertical bearing 92 on the left-hand subframe 36. A suspension spring 94 is provided between the member 90 and the bearing 92. As shown, the spring 94 is of the coiled compression type and is mounted around the member 90. The drive motor 68 is mounted on the upper end of the slidable member 90, so that the motor always moves with the wheel 32.

It will be recognized that the outboard wheels 32 and 34 may also be steerable. Moreover, a four wheeled vehicle can be provided, with parallelogram linkages between both pairs of outboard wheels and the main frame. With such an arrangement, the outboard wheels of at least one pair are steerable.

The tricycle of the present invention has inherent stability and thus will remain upright when stationary. Moreover, it is possible to ride at low speeds without any balancing effort.

When curves are negotiated, particularly at high speeds, the entire tricycle is banked to the right or to the left as shown in FIGS. 3 and 4. All three wheels remain in contact with the ground at all times. The banking action makes it possible to ride the tricycle in the manner of a motorcycle so that full stability can be maintained by the operator when negotiating curves at high speeds.

The vehicle of the present invention is particularly advantageous when bumps are encountered while negotiating turns. The provision of two rear wheels largely obviates the skidding and fishtailing which tend to occur when bumps are encountered by conventional motorcycles while negotiating turns. Thus, the vehicle of the present invention provides greater roadability and an added factor of safety. When the brakes are applied, the vehicle of the present invention provides better steering and much less tendency to fishtail than in the case of the conventional motorcycle.

I claim:

1. A tricycle type vehicle, comprising:
  a generally upright main frame;
  a front wheel fork pivotally mounted on said main frame;
  a single front wheel rotatably mounted on said fork;
  steering means on said fork for turning said fork to steer said front wheel;
  a pair of rear subframes disposed on opposite sides of said mean frame and sa spaced laterally therefrom;
  a pair of rear wheels rotatably mounted on said respective subframes;
  a parallelogram linkage between said main frame and said subframes for keeping said rear wheels generally parallel to each other and to said main frame while providing for banking of said main frame;
  said linkage comprising upper and lower generally parallel and horizontal levers having corresponding upper and lower pivotal connections to said main frame;
  said subframes having corresponding upper and lower levers;
  said levers being rockable relative to said main frame to provide for banking of said main frame;
  engine mounted on said main frame; and
  driving means operable by said engine for driving said rear wheels without interfering with the banking action of said main frame relative to said subframes and said rear wheels.

2. A vehicle according to claim 1, including a pair of tension springs connected between said main frame and opposite end portions of at least one of said levers for resiliently urging said main frame toward an upright position.

3. A vehicle according to claim 1, including a pair of tension springs stretched between said main frame and opposite end portions of said upper lever for resiliently urging said main frame toward an upright position.

4. A vehicle according to claim 1; including resilient means connected between said main frame and said parallelogram linkage for urging said main frame toward an upright position.

5. A vehicle according to claim 1, including a pair of springs connected between said main frame and at least one of said levers for urging said main frame toward an upright position.

6. A vehicle according to claim 1, including resilient suspension means between each of said rear wheels and the core corresponding subframe.

7. A vehicle according to claim 1:
  in which said drive means comprise a pair of hydraulic motors mounted on said subframes and connected to said rear wheels for driving said rear wheels;
  a hydraulic pump on said main frame and operable by said engine; and
  means for supplying hydraulic fluid from said pump to said motors to operate said motors.